United States Patent [19]

Mackinnon et al.

[11] Patent Number: 5,597,111
[45] Date of Patent: Jan. 28, 1997

[54] CORRUGATED THERMOPLASTIC BLANK FOR A CONTAINER

[75] Inventors: Malcolm R. Mackinnon, London, England; Ronald Grobler, Cape Town, South Africa

[73] Assignee: Korpak Limited, London, England

[21] Appl. No.: 374,613

[22] PCT Filed: Jul. 16, 1993

[86] PCT No.: PCT/GB93/01505

§ 371 Date: Mar. 20, 1995

§ 102(e) Date: Mar. 20, 1995

[87] PCT Pub. No.: WO94/02364

PCT Pub. Date: Feb. 3, 1994

[30] Foreign Application Priority Data

Jul. 16, 1992 [GB] United Kingdom ............... 9215103

[51] Int. Cl.⁶ ............................. B65D 5/20; B65D 5/42
[52] U.S. Cl. ................. 229/3.5 R; 220/443; 220/445; 229/919; 229/939
[58] Field of Search ........................ 229/3.1, 3.5 R, 229/919, 939; 220/441, 443, 445; 428/35.7, 182

[56] References Cited

U.S. PATENT DOCUMENTS

| | | | |
|---|---|---|---|
| 3,509,005 | 4/1970 | Hartig | 229/3.5 R |
| 3,841,935 | 10/1974 | Dicks et al. | 428/182 |
| 4,267,223 | 5/1981 | Swartz | 428/182 |
| 4,515,648 | 5/1985 | Kolbe . | |
| 4,535,929 | 8/1985 | Sherman, II et al. | 229/921 |
| 4,762,270 | 8/1988 | Stoll et al. | 229/939 |
| 4,763,833 | 8/1988 | Stoll | 229/939 |
| 4,828,894 | 5/1989 | Taylor | 229/23 R |
| 4,948,039 | 8/1990 | Amatangelo | 220/445 |
| 5,163,611 | 11/1992 | Singer | 229/919 |
| 5,351,846 | 10/1994 | Carter | 220/443 |

FOREIGN PATENT DOCUMENTS

| | | |
|---|---|---|
| 288584 | 11/1988 | European Pat. Off. . |
| 3813104 | 11/1989 | Germany . |
| 1593730 | 7/1981 | United Kingdom . |
| 8605159 | 9/1986 | WIPO . |
| 9104849 | 4/1991 | WIPO . |

OTHER PUBLICATIONS

The Wiley Encyclopedia of Packaging Technology, John Wiley & Sons (1986), pp. 226–228.

Primary Examiner—Gary E. Elkins
Attorney, Agent, or Firm—Kohn & Associates

[57] ABSTRACT

This invention relates to a corrugated thermoplastic blank for a container. The blank (20) has a base panel (24) with wall panels (26, 28, 30, 32) connected to the base panel (24) by fold lines (38). The fold lines (38) comprise weld lines which destroy the original memory of the thermoplastic material. The free edges of the blank are sealed by seals (38) which prevent water from entering the blank. The sealed free edges and/or the weld lines or line (38) surround and reinforce each panel (26, 28, 30, 32) and increase the strength of each panel and thereby the strength of a container erected from the blank.

10 Claims, 3 Drawing Sheets

5,597,111

CORRUGATED THERMOPLASTIC BLANK FOR A CONTAINER

TECHNICAL FIELD

This invention relates to a corrugated thermoplastic blank for producing a container.

BACKGROUND OF THE INVENTION

Corrugated thermoplastic sheet has proved to be unsuitable for the construction of boxes especially where relatively heavy loads are to be carried in such boxes. These relatively heavy loads may comprise fish or vegetables which weigh in the order of 4 to 15 kilograms. Boxes constructed from the corrugated thermoplastic sheet have been too weak for these loads. Such corrugated thermoplastic sheet has traditionally been 3 to 4 mm thick and has had a weight of approximately 600 grams per m$^2$ with a buckling load resistance index of about 100. This sheet could simply be made thicker and heavier to increase its strength. However by increasing the thickness and the weight of the sheet, more material is used and consequently it is not cost effective to increase the thickness and the weight of the sheet to increase the strength of the sheet.

SUMMARY OF THE INVENTION

It is an object of this invention to provide a lightweight yet sufficiently strong blank made of corrugated thermoplastic sheet.

The applicant has addressed the above objective by increasing the overall thickness of the sheet whilst using substantially the same amount of material as used in prior an sheets. The skins and flutes of this sheet are thus thinner than the prior art sheets. However such sheet is unsuitable for the construction of the required boxes since the flutes can collapse as the skins move relative to one another.

It is accordingly a further object of this invention to provide a reinforced lightweight, corrugated thermoplastic blank which can be used to produce a box of sufficient strength.

Corrugated thermoplastic boxes have suffered from the disadvantage that water can be trapped between the two skins of the corrugated sheet. Such water, besides adding to the weight of a box, can promote the growth of bacteria which is obviously undesirable especially in food applications.

The thermoplastic material, especially polypropylene, has a memory which is not destroyed by the creation of fold lines which are created in the same manner in which fold lines are created in corrugated cardboard blanks. Thus even after a fold line has been created on a sheet of polypropylene in the traditional corrugated cardboard manner, the sheet is not easily folded along that line because it tends to return to its original unfolded planar shape because of its memory. It is important that the walls of a box erected from the blank be perpendicular to the base of the box. If the original memory of the thermoplastic sheet is not destroyed the sidewalls of the box will tend to move out of their perpendicular orientation and thus decrease the stacking strength of the box.

It is accordingly a further object of this invention to provide a corrugated thermoplastic blank for a box in which water cannot become trapped within the corrugated sheet and wherein the original memory of the thermoplastic material is substantially reduced or destroyed along the fold lines of the blank.

According to the invention a container blank made of corrugated thermoplastic sheet having two skins spaced from one another by flutes includes a base panel connected to wall panels by fold lines each comprising a weld line welding the two skim together and substantially reducing or destroying the original memory of the thermoplastic along the length of the weld line, and wherein the free edges of the blank are sealed to prevent liquid from entering the blank with the weld lines and the sealed free edges and/or the weld lines surrounding and reinforcing each panel thereby increasing the strength of each panel of the blank and thereby the strength of a container erected from the blank.

The sheet is preferably at least 5 mm thick but not thicker than 10 mm and may be between 6,0 mm and 7,5 mm thick.

The sheet may weigh between 400 and 850 grams/m$^2$. Preferably the sheet weighs between about 500 grams/m$^2$ and about 700 grams/m$^2$.

The panels of the blank preferably have a buckling load resistance index of between 300 and 500.

The blank may include a plurality of apertures in at least one of the panels with the edges of the apertures being sealed.

At least one of the panels my include at least one weld within its periphery which increases the strength of the panel.

The thermoplastic is preferably polypropylene.

BRIEF DESCRIPTION OF THE DRAWINGS

The invention will now be described by way of a non-limiting example with reference to the accompanying drawings in which.

DETAILED DESCRIPTION OF THE INVENTION

Figure 1:
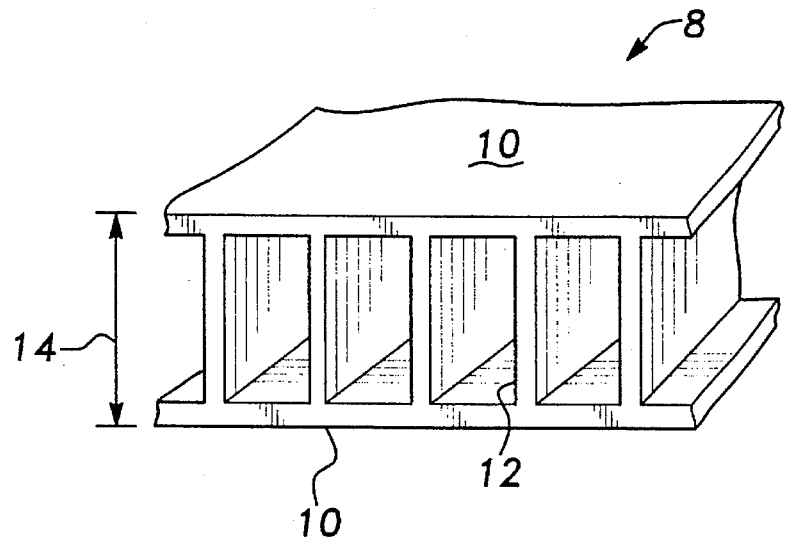
FIG. 1 is an end view of part of a sheet of corrugated polypropylene sheet used for forming a blank.

Referring firstly to FIG. 1, an extruded sheet 8 of corrugated polypropylene consists of two skins 10 spaced from one another by flutes 12. The overall thickness of the sheet is 7 mm as indicated by reference numeral 14 and the weight of the sheet is in the order of 600 grams per m$^2$.

Referring now to FIGS. 2 to 6, the sheet 8 is die cut by heat and pressure to form a blank 20 and two end sections 20.1 for a box 22. The blank 20 has a base panel 24, side panels 26, end panels 28, oblique panels 30 and flaps 32. The end sections 20.1 of the blank each include an end panel 34 and two flaps 36.

Figure 4:
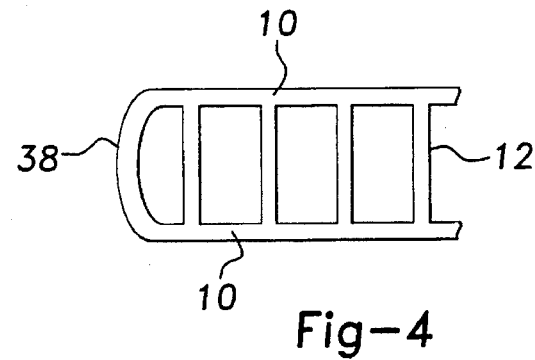
FIG. 4 is a cross-sectional view on line IV—IV of FIG. 2.

When the blank 20 and the end sections 20.1 are die cut, their free edges are sealed by seals 38 as shown in FIG. 4. The sealed free edges prevent water from entering the blank and becoming trapped within the blank.

Figure 5:
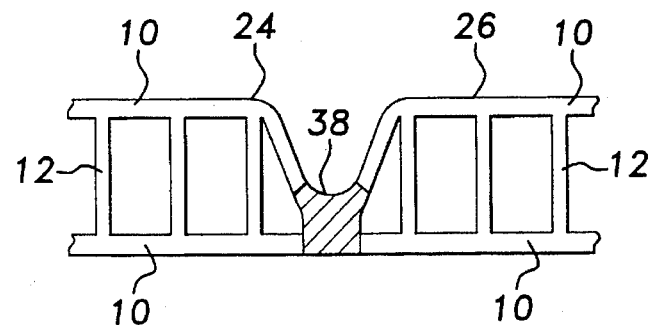
FIG. 5 is a cross-sectional view on line V—V of FIG. 2.
Figure 6:
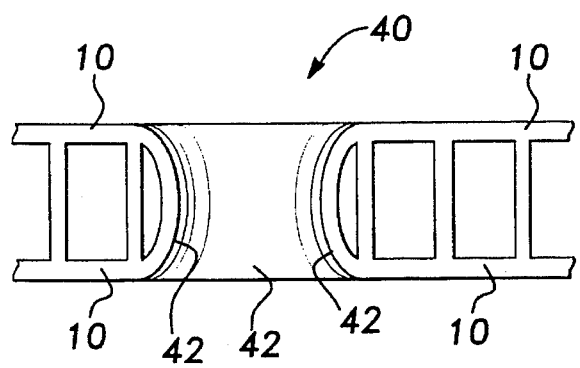
FIG. 6 is a cross-sectional view on line VI—VI of FIG. 2.
Figure 7:
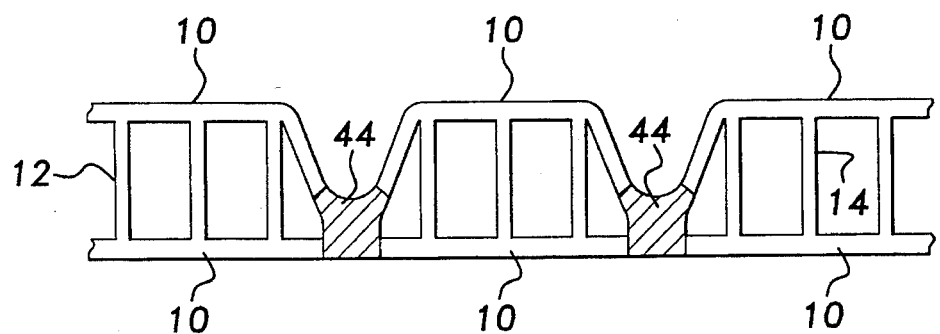
FIG. 7 is a cross-sectional view on line VII—VII of FIG. 2.

As shown in FIG. 5, fold lines 38 separate the panels from one another. The fold lines 38 are weld lines which weld the two skins 10 together. The original memory of the polypropylene is substantially destroyed along these weld lines.

Each panel is surrounded by its sealed free edges and/or its weld line or lines which reinforce the panel and increase its strength especially with respect to its resistance to buckling, shear and torsional forces.

Holes 40 are formed in the base panel 24. The edge of each hole is sealed by a seal 42 which connects the skins 10 together. The applicant has found that the holes with their sealed free edges increase the strength of the panels with regard to resistance to buckling, shear and torsional forces acting across the flutes. The holes 40 also act as drainage holes.

Internal circular welds 44 are provided on the base panel 24. These circular welds 44 weld the two skins 10 together. The circular welds 44 could also be provided in the other panels of the blank. The applicant has found that these circular welds strengthen the panels with regard to buckling, shear and torsional forces acting across the flutes. These welds 44 need not be circular but may be of any suitable shape and can be arranged to dissipate stress dependent on their pattern, size and position.

Figure 3:
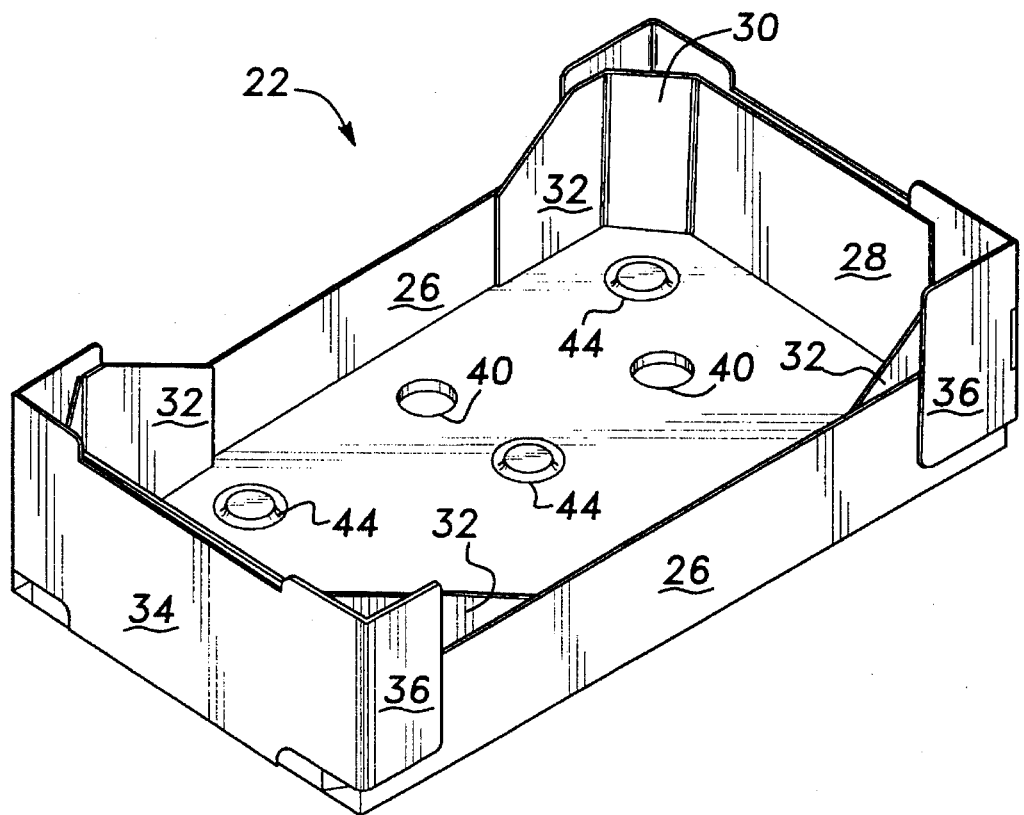
FIG. 3 is a perspective view of a box formed from the blank of FIG. 2.
Figure 2:
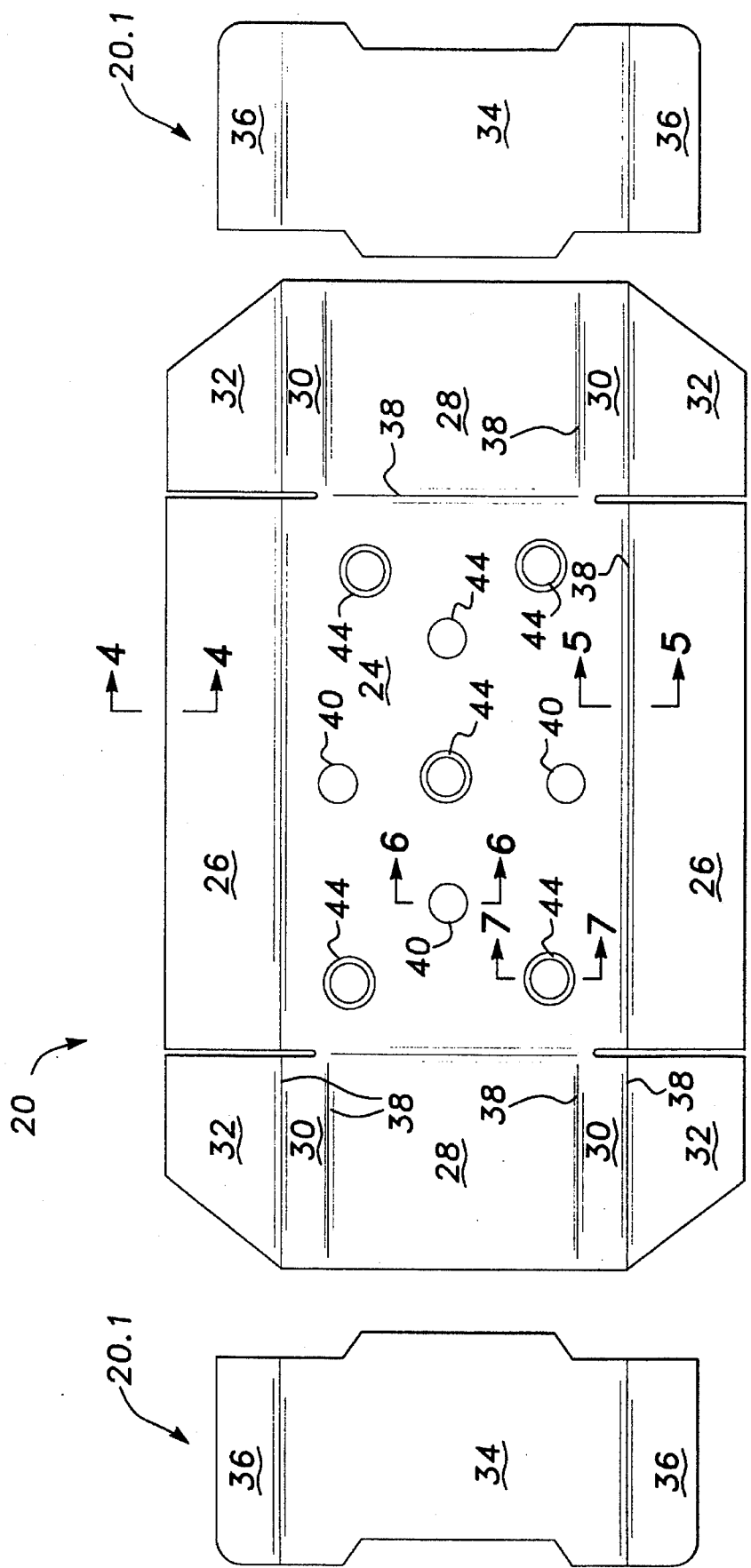
FIG. 2 is a plan view of a blank for forming a box.

The blanks 20 and the end sections 20.1 are erected to form the box 22 which is shown in FIG. 3.

The applicant has found that a corrugated polypropylene blank with a thickness in the range of 5 mm to 10 mm with a weight in the range of 400 to 850 grams/m$^2$ provides a lightweight box which is stronger than prior art boxes for a given weight. The panels of the blank according to the invention have a buckling load resistance index of between 300 and 500.

It will be appreciated that many modifications or variations of the invention are possible without departing from the spirit or scope of the invention. For example the corrugated sheet could be made from polyethylene or any other suitable olefin. The flutes may be vertical, sinusoidal, double sinusoidal or inclined relative to their skins.

We claim:

1. A container blank made of corrugated thermoplastic sheet having two skins spaced from one another by flutes, said blank including a base comprising a weld line welding the two skins together and substantially reducing or destroying the original memory of the thermoplastic along the length of the weld line, and wherein the blank includes edges being sealed to prevent liquid from entering the blank and surrounding and reinforcing each panel thereby increasing the strength of each panel of the blank and thereby the strength of a container erected from the blank, the corrugated thermoplastic sheet being between 5 mm and 10 mm thick and having a weight of between 400 grams/m$^2$ and 850 grams/m$^2$.

2. The blank of claim 1 wherein the corrugated thermoplastic sheet is between 6.0 mm and 7.5 mm thick.

3. The blank of claim 1 wherein the corrugated thermoplastic sheet has a weight of between 400 grams/m$^2$ and 700 grams/m$^2$.

4. The blank of claim 1 wherein the panels of the blank have a buckling load resistance index of between 300 and 500.

5. The blank of claim 1 including a plurality of apertures including edges in at least one of the panels, the edges of the apertures being sealed.

6. The blank of claim 1 wherein at least one of the panels includes a periphery and further includes at least one weld within said periphery thereof which increases the strength of said at least one of the panels.

7. The blank of claim 1 wherein the thermoplastic is polypropylene.

8. The blank as claimed in claim 1 wherein said blank is erected into a form of a container in the shape of a box.

9. A container as set forth in claim 1 wherein said sealed free edges surround and reinforce each panel.

10. A container as set forth in claim 1 wherein said weld lines surround and reinforce each panel.

* * * * *